US00RE51116E

(19) United States
(12) Reissued Patent
Chi et al.

(10) Patent Number: US RE51,116 E
(45) Date of Reissued Patent: Nov. 10, 2026

(54) BATTERY PACK HAVING EXPANDABLE BATTERY MODULE STRUCTURE

(71) Applicant: LG Energy Solution, Ltd., Seoul (KR)

(72) Inventors: Ho-June Chi, Daejeon (KR); Dong-Yeon Kim, Daejeon (KR); Dal-Mo Kang, Daejeon (KR); Jin-Hak Kong, Daejeon (KR); Jeong-O Mun, Daejeon (KR); Jin-Yong Park, Daejeon (KR); Sung-Won Seo, Daejeon (KR); Yong-Seok Choi, Daejeon (KR); Yoon-Koo Lee, Daejeon (KR)

(73) Assignee: LG Energy Solution, Ltd., Seoul (KR)

(21) Appl. No.: 18/373,758

(22) Filed: Sep. 27, 2023

Related U.S. Patent Documents

Reissue of:
(64) Patent No.: 11,264,670
Issued: Mar. 1, 2022
Appl. No.: 16/348,754
PCT Filed: Feb. 12, 2018
PCT No.: PCT/KR2018/001836
§ 371 (c)(1),
(2) Date: May 9, 2019
PCT Pub. No.: WO2018/186581
PCT Pub. Date: Oct. 11, 2018

(30) Foreign Application Priority Data

Apr. 7, 2017 (KR) ..... 10-2017-0045394
Jan. 30, 2018 (KR) ..... 10-2018-0011460

(51) Int. Cl.
*H01M 50/262* (2021.01)
*B60K 6/28* (2007.10)
(Continued)

(52) U.S. Cl.
CPC ..... *H01M 50/262* (2021.01); *B60L 50/64* (2019.02); *H01M 50/204* (2021.01);
(Continued)

(58) Field of Classification Search
CPC ..... H01M 50/211; H01M 50/204; H01M 50/242; H01M 50/249; H01M 50/262;
(Continued)

(56) References Cited

U.S. PATENT DOCUMENTS 4,957,829 A 9/1990 Holl
10,056,658 B2 8/2018 Park et al.
(Continued)

FOREIGN PATENT DOCUMENTS

CN 201201572 Y 3/2009
CN 203481297 U 3/2014
(Continued)

OTHER PUBLICATIONS

International Search Report for PCT/KR2018/001836, mailed Jun. 7, 2018.
(Continued)

*Primary Examiner* — Christina Y. Leung
(74) *Attorney, Agent, or Firm* — Lerner David LLP

(57) ABSTRACT

Disclosed is a battery pack, which includes a plurality of unit battery modules, each unit battery module having a plurality of battery cells accommodated in an inner space thereof, the plurality of unit battery modules being structurally connected successively in one direction; and a pack case configured to cover the plurality of unit battery modules, wherein each unit battery module has two side plates forming opposite side surfaces thereof, and wherein one of the side plates of any one of the unit battery modules and one of the side plates of another one of the unit battery modules adjacent thereto are engaged with each other to form a single common wall.

8 Claims, 8 Drawing Sheets

(51) Int. Cl.

| | |
|---|---|
| ***B60L 50/64*** | (2019.01) |
| ***H01M 50/204*** | (2021.01) |
| ***H01M 50/211*** | (2021.01) |
| ***H01M 50/242*** | (2021.01) |
| ***H01M 50/249*** | (2021.01) |
| ***H01M 50/264*** | (2021.01) |

(52) U.S. Cl.
CPC ..... *H01M 50/211* (2021.01); *H01M 50/242* (2021.01); *H01M 50/249* (2021.01); *H01M 50/264* (2021.01); *B60K 6/28* (2013.01); *B60Y 2200/91* (2013.01); *B60Y 2200/92* (2013.01); *B60Y 2400/112* (2013.01); *H01M 2220/20* (2013.01)

(58) Field of Classification Search
CPC . H01M 50/264; H01M 2220/20; B60L 50/64; B60Y 2400/112; B60Y 2200/92; B60Y 2200/91; Y02T 10/70; B60K 6/28; Y02E 60/10
See application file for complete search history.

(56) References Cited

U.S. PATENT DOCUMENTS

| | | | |
|---|---|---|---|
| 2009/0111015 | A1 | 4/2009 | Wood et al. |
| 2009/0233163 | A1 | 9/2009 | Fang et al. |
| 2010/0045333 | A1 | 2/2010 | Nodine |
| 2010/0190048 | A1 | 7/2010 | Yang et al. |
| 2013/0236751 | A1 | 9/2013 | Seong et al. |
| 2015/0249239 | A1 | 9/2015 | Ueda et al. |
| 2015/0270514 | A1 | 9/2015 | Baek et al. |

FOREIGN PATENT DOCUMENTS

| | | | | | |
|---|---|---|---|---|---|
| CN | 105977420 | A | | 9/2016 | |
| CN | 106299504 | A | | 1/2017 | |
| GB | 2044983 | A | * | 10/1980 | ..... H01M 50/502 |
| JP | S40006133 | | | 3/1965 | |
| JP | S40019796 | Y1 | | 7/1965 | |
| JP | S63015566 | U | | 2/1988 | |
| JP | 2002225570 | A | | 8/2002 | |
| JP | 2003068351 | A | | 3/2003 | |
| JP | 2005285452 | A | | 10/2005 | |
| JP | 3144501 | U | | 9/2008 | |
| JP | 4399675 | B2 | | 1/2010 | |
| JP | 2014501021 | A | | 1/2014 | |
| JP | 2014075283 | A | | 4/2014 | |
| JP | 2014216189 | A | | 11/2014 | |
| JP | 2016500911 | A | | 1/2016 | |
| KR | 20060062006 | A | | 6/2006 | |
| KR | 20080034220 | A | | 4/2008 | |
| KR | 20110018810 | A | | 2/2011 | |
| KR | 20130105472 | A | | 9/2013 | |
| KR | 101435441 | B1 | | 8/2014 | |
| KR | 20160005894 | A | | 1/2016 | |
| KR | 20160109679 | A | | 9/2016 | |
| WO | WO-2016129473 | A1 | * | 8/2016 | ..... H01M 50/20 |
| WO | 2016179557 | A1 | | 11/2016 | |

OTHER PUBLICATIONS

Supplementary European Search Report for Application No. EP18781567 dated Dec. 12, 2019.
Search Report from Chinese Application No. 201880005180.9 dated Jul. 5, 2021. 2 pgs.

* cited by examiner

BATTERY PACK HAVING EXPANDABLE BATTERY MODULE STRUCTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is an application for reissue of U.S. Pat. No. 11,264,670, which* is a national phase entry under 35 U.S.C. § 371 of International Patent Application No. PCT/KR2018/001836, filed on Feb. 12, 2018, published in Korean, which claims priority from Korean Patent Application Nos. 10-2017-0045394, filed on Apr. 7, 2017, and 10-2018-0011460, filed on Jan. 30, 2018, the disclosures of all of which are hereby incorporated herein by reference.

TECHNICAL FIELD

The present disclosure relates to a battery pack, and more particularly, to a battery module loading structure capable of enhancing both mechanical stiffness and energy density.

BACKGROUND ART

Unlike a primary battery which is not rechargeable, a secondary battery refers to a battery capable of charging and discharging and is used as a power source for an energy storage system (ESS), an electric vehicle (EV) or a hybrid electric vehicle (HEV) as well as small advanced electronic devices such as a mobile phone, a PDA and a notebook computer.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

For example, when a plurality of battery cells are connected in series or in parallel to configure a battery pack, it is common to configure a battery module composed of a plurality of battery cells first, and then configure a battery pack by using a plurality of battery modules and adding other components. In other words, the battery module refers to a component where a plurality of secondary batteries are connected in series or in parallel, and the battery pack refers a component where a plurality of battery modules are connected in series or in parallel to increase capacity and output.

Meanwhile, in the case of an electric vehicle, unexpected shocks and vibrations may be applied to the battery pack during operation. In this case, the electrical connection between the battery modules may be broken, or the pack case supporting the battery modules may be deformed. Thus, the battery pack for an electric vehicle is required to have sufficient durability against external shocks and vibrations. In order to enhance the durability of the battery pack, a crash beam is often used. Here, the crash beam may refer to a beam-like structure that is installed at a tray of the battery pack case.

However, if the crash beam is installed, the mechanical stiffness of the battery pack is improved, but the space available to mount battery modules is reduced as much as the space of the crash beam, thereby lowering the energy density and increasing difficulty in assembling the battery modules and the crash beam.

For example, referring to FIG. 1, in a conventional battery pack, unit battery modules 2 and crash beams 3 are individually installed in a tray 1 of a pack case. If the plurality of unit battery modules 2 and crash beams 3 are individually installed as in FIG. 1, a number of coupling members are used and a complicated mounting process is required, which takes a long time to assemble the battery pack. In addition, the battery pack with the crash beams 3 is difficult to increase the energy density due to its configuration, and further, an unnecessary gap C is present between the unit battery modules 2 and the crash beams 3, which further deteriorates the space utilization. Thus, it is required to develop a battery pack with a new structure capable of increasing the energy density while maintaining the mechanical stiffness like the conventional battery pack equipped with the crash beams 3.

DISCLOSURE

Technical Problem

The present disclosure is designed to solve the problems of the related art, and therefore the present disclosure is directed to providing a battery pack capable of minimizing an unnecessary dead space and the number of coupling components, increasing energy density, and increasing mechanical stiffness.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising: a plurality of unit battery modules, each unit battery module having a plurality of battery cells accommodated in an inner space thereof, the plurality of unit battery modules being structurally connected successively in one direction; and a pack case configured to cover the plurality of unit battery modules, wherein each unit battery module has two side plates forming opposite side surfaces thereof, and wherein one of the side plates of any one of the unit battery modules and one of the side plates of another one of the unit battery modules adjacent thereto are engaged with each other to form a single common wall.

The two side plates of each unit battery module may include a right side plate forming a right surface of the respective unit battery module and a left side plate forming a left surface of the respective unit battery module.

The right side plate of the any one of the unit battery modules may be engaged with the left side plate of the another one of the unit battery modules adjacent thereto.

The one of the side plates of the any one of the unit battery modules may have a fitting protrusion extending therefrom, and the one of the side plates of the another one of the unit battery modules may have a fitting groove extending therein, so that the fitting protrusion fits into the fitting groove.

The right side plate and the left side plate of each unit battery module may be symmetrical with one another.

The right side plate and the left side plate of each unit battery module may each have longitudinal sections having an "L" shape, the right side plate being inverted relative to the left side plate, and the right and left side plates may be shorter than a height of the respective unit battery module so that a right side step is formed between a lower end surface of the unit battery module and a lower end surface of the right side plate, and a left side step is formed between an upper end surface of the unit battery module and an upper end surface of the left side plate.

Each unit battery module may include an upper plate and a lower plate, which cover upper and lower portions of the inner space, respectively, and the upper and lower plates of each unit battery module may have a step portion formed therein by bending an edge portion of one side thereof, the step portion of the upper and lower plates configured to mate with the left side step and the right side step of adjacent ones of the unit battery modules.

The side plates of each unit battery module may each have engagement surfaces having a zigzag shape.

The pack case may include a tray having an internal space in which the plurality of unit battery modules are placed, and the plurality of unit battery modules may be mounted onto the tray by a coupling member that couples the single common wall to the tray.

The pack case may include a tray having an internal space in which the plurality of unit battery modules are placed and have a plurality of module connection units protruding from an inner surface of a wall surrounding the internal space, and each of the side plates of each unit battery module may include a tray connection unit that protrudes from the side plate in respective front and rear directions of the unit battery module, and each tray connection unit may have a groove formed therein that is configured to be engaged with a corresponding one of the module connection units so as to be inserted into and coupled to the corresponding one of the module connection units.

Each module connection unit may include a head portion configured to be placed in sliding engagement with the groove of a corresponding one of the tray connection units.

In another aspect of the present disclosure, there is also provided a vehicle including the above battery pack.

Advantageous Effects

According to an embodiment of the present disclosure, it is possible to provide a battery pack capable of minimizing an unnecessary dead space and the number of coupling components, increasing energy density, and increasing mechanical stiffness.

According to another embodiment of the present disclosure, the capacity of the battery pack may be extended very simply.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
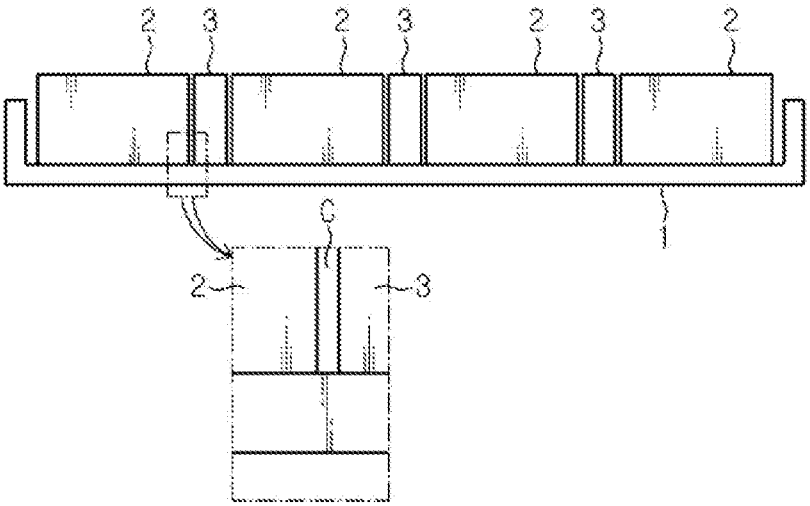
FIG. 1 is a schematic cross-sectioned view showing a conventional battery pack equipped with crash beams.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Since the embodiments disclosed herein are provided for more perfect explanation of the present disclosure, the shape, size and the like of components may be exaggerated, omitted or simplified in the drawings for better understanding. Thus, the size and ratio of components in the drawings do not wholly reflect the actual size and ratio.

Referring to the figures, a unit battery module 100 according to the present disclosure may include a plurality of battery cells 110 accommodated in an inner space S and a module housing forming the inner space S.

The plurality of battery cells 110 may be lithium ion batteries, lithium polymer batteries, nickel cadmium batteries, nickel hydrogen batteries, nickel zinc batteries, or the like, which allow charging and discharging. The battery cells 110 may be connected in series and/or in parallel depending on the required output voltage or charge/discharge capacity. In this embodiment, the plurality of battery cells 110 may be pouch-type secondary batteries, and in this case, the battery module 100 may further include a stacking frame (not shown) for stacking the pouch-type secondary batteries.

Though not shown in detail, the stacking frame serving a means for stacking the secondary batteries prevents the secondary batteries from moving by holding them and is configured to be stacked on one another to guide the assembling of the secondary batteries.

The module housing forms the appearance of the unit battery module 100 may have an inner space S for accommodating the plurality of battery cells 110 therein.

Figure 2:
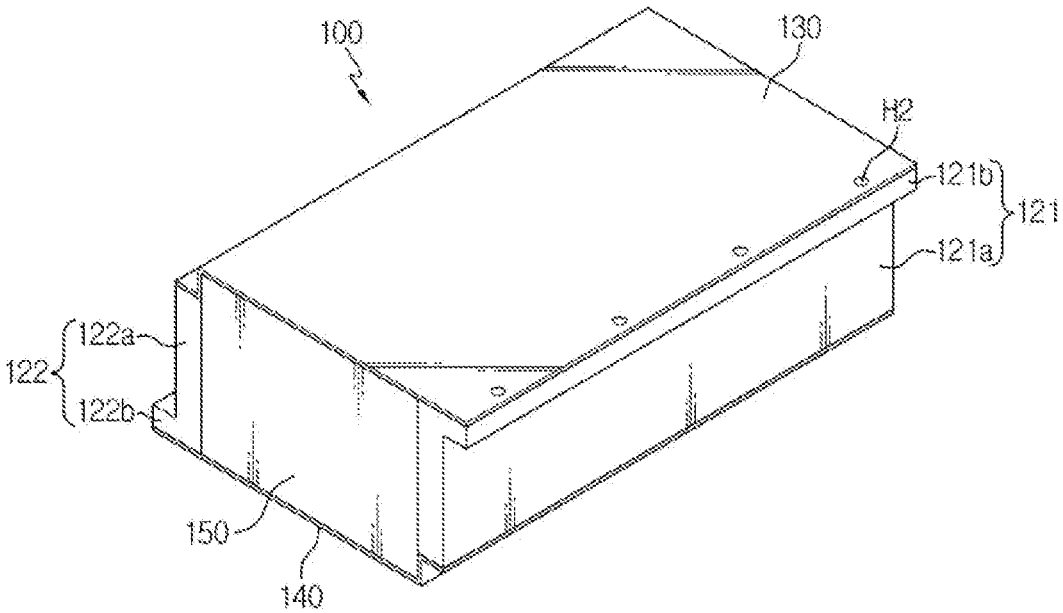
FIG. 2 is a perspective view showing a unit battery module according to an embodiment of the present disclosure.
Figure 3:
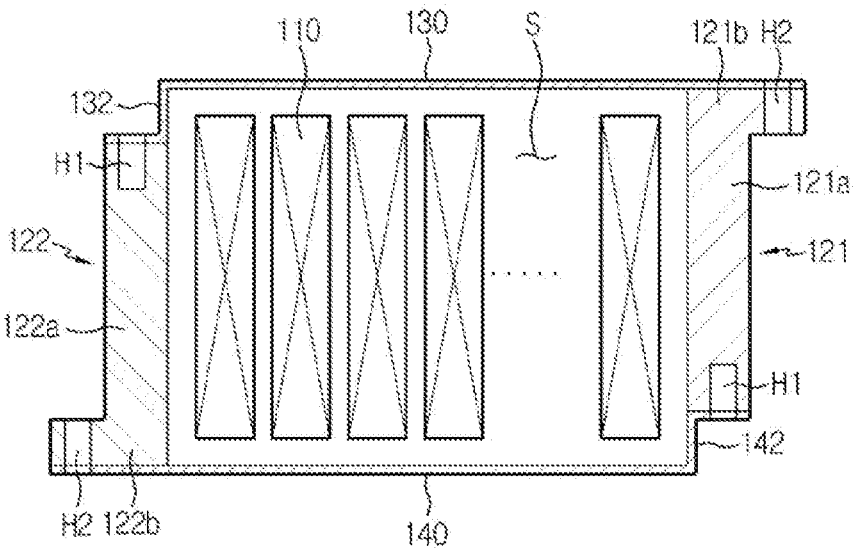
FIG. 3 is a schematic cross-sectioned view of FIG. 2.

Specifically, referring to FIGS. 2 and 3, the module housing according to this embodiment has a substantially rectangular parallelepiped shape in which the inner space S is formed. That is, the module housing includes two side plates 121, 122 provided to be mutually opposed to each other to form both side surfaces of the inner space S, an upper plate 130 forming an upper surface of the inner space S and connecting upper edges of both side plates 121, 122 to each other, and a lower plate 140 provided to face the upper plate 130 to form a lower surface of the inner space S and connecting lower edges of both side plates 121, 122 to each other.

In addition, the battery module 100 may further include a front cover 150 and a rear cover (not shown) that may cover front and rear surfaces, if necessary. Though the front cover 150 and the rear cover are just schematically illustrated in the figures for the sake of convenience, electrical components including a plurality of bus bars that may be electrically connected to electrode leads of the battery cells 110 may be assembled to the front cover 150 and the rear cover. Also, terminal terminals employed at the unit battery module 100 may be provided at the front cover 150 and/or the rear cover.

The module housing forms the appearance of the battery module 100 and may provide a mechanical supporting force to protect the battery cells 110 accommodated in the inner space S from external impacts or the like. Thus, the module housing may be made of metal such as steel to ensure rigidity.

As will be described in more detail below, the unit battery module 100 of the present disclosure may be successively coupled to other unit battery modules 200 in one direction by means of a structural connection between the side plates 121, 222.

The side plates 121, 122 of the unit battery module 100 will be described in more detail. The side plates 121, 122 include a right side plate 121 forming a right surface of the unit battery module 100 and a left side plate 122 forming a left surface of the unit battery module 100.

The right side plate 121 and the left side plate 122 may be symmetrically formed in a right and left direction. The right side plate 121 and the left side plate 122 of this embodiment are formed to have longitudinal sections with a substantially "L" shape and may be inverted with respect to each other. For example, as shown in FIG. 2, the right side plate 121 and the left side plate 122 respectively cover both side surfaces of the unit battery module 100 symmetrically in an inverted state with respect to each other.

In addition, the height of the two side plates 121, 122 according to this embodiment may be somewhat lower than the height of the entire unit battery module 100. In other words, the length of the right side plate 121 and the left side plate 122 is shorter than the length corresponding to the height of the unit battery module 100. Accordingly, steps are formed between a lower end surface of the unit battery module 100 and a lower end surface of the right side plate 121 and between an upper end surface of the unit battery module 100 and an upper end surface of the left side plate 122, respectively. The empty space generated by the step is utilized as a space for assembling another unit battery module 200 later.

Also, the upper plate 130 and the lower plate 140 may have a step structure to connect the upper edges or the lower edges of the two side plates 121, 122.

The upper plate 130 and the lower plate 140 are components of the module housing and serve to cover the upper and lower portions and a part of the side portions of the battery cells 110 and support the upper and lower portions of the right side plate 121 and the left side plate 122.

Specifically, as shown in FIGS. 2 and 3, the upper plate 130 and the lower plate 140 are respectively formed in a plate shape covering the upper and lower portions of the inner space of the module housing, and step portions 132, 142 are formed at one edge portion thereof in a bent form.

The step portion 132 of the upper plate 130 is provided at a left edge portion to compensate for the short length of the left side plate 122 and the step portion 142 of the lower plate 140 is provided at a right edge portion to compensate for the short length of the right side plate 121.

In other words, in any one unit battery module 100, the right side plate 121 and the left side plate 122 are formed to have a length shorter than the height of the unit battery module 100 for the assembling with another unit battery module 200. Since the upper plate 130 and the lower plate 140 have the step portions 132, 142 at one side edge portion, respectively, it is possible to support the relatively short side plates 121, 122 in an upper and lower direction to be located at a predetermined height up and down and simultaneously compensate for the insufficient side covering function of the side plates 121, 122.

Hereinafter, for the sake of convenience, a portion of the upper plate 130 or the lower plate 140 where the side plates 121, 122 are vertically arranged with respect thereto will be referred to as a first engagement portion 121a, and a portion where the side plates 121, 122 are horizontally arranged will be referred to as a second engagement portions 121b.

Referring to FIG. 3 again, the upper end surface of the first engagement portion 121a of the left side plate 122 may be coupled to a stepped left end of the upper plate 130 to face the stepped left end, and the lower end surface of the second engagement portion 121b may be coupled to a flat left end of the lower plate 140 to face the flat left end. In addition, the lower end surface of the first engagement portion 121a of the right side plate 121 may be coupled to a stepped end of the lower plate 140 to face the stepped end, and the upper end surface of the second engagement portion 121b may be coupled to a flat right end of the upper plate 130 to face the flat right end.

In addition, first coupling holes H1 may be formed at the first engagement portions 121a, 122a of each side plate in the upper and lower direction so that a coupling member B may be inserted therein to a certain depth, and second coupling holes H2 may be formed at the second engagement portions 121b, 122b in the upper and lower direction so that the coupling members B may pass therethrough.

Figure 4:
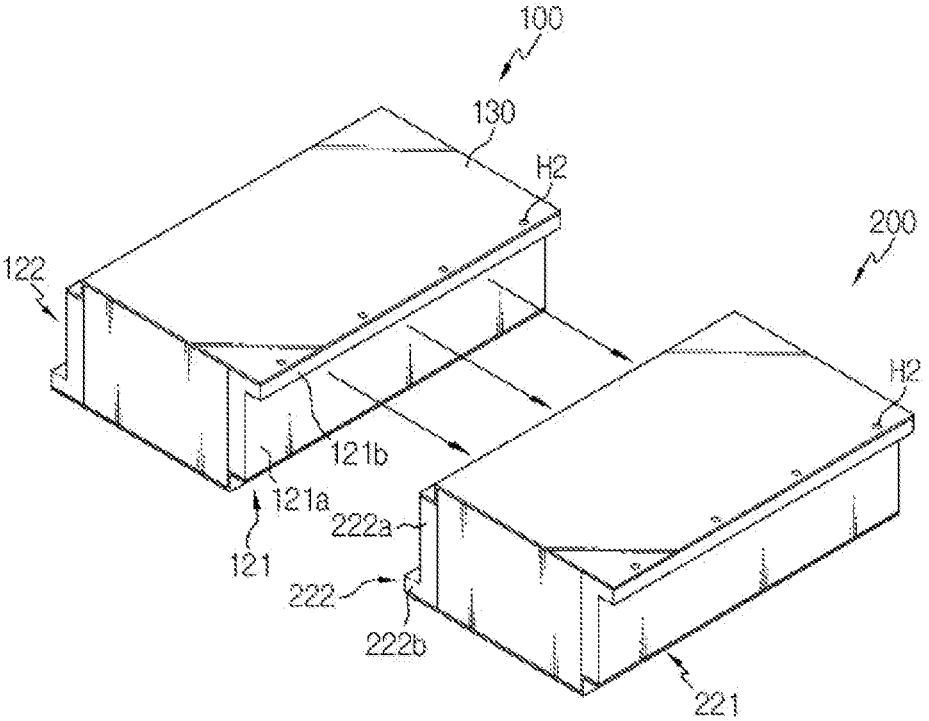
FIG. 4 is a diagram for illustrating a connection method of the unit battery module according to an embodiment of the present disclosure.

As shown in FIG. 4, the unit battery module 100 having two side plates 121, 122 may be connected to another unit battery module 200 in the right and left direction. At this time, the right side plate 121 of any one unit battery module 100 may be engaged with the left side plate 222 of another unit battery module 200, and the right side plate 121 and the left side plate 222 engaged as above form a single common wall W between two unit battery modules 100, 200.

Hereinafter, a battery pack composed of such unit battery modules 100, 200, 300 will be described in more detail with reference to FIGS. 5 and 6.

Figure 5:
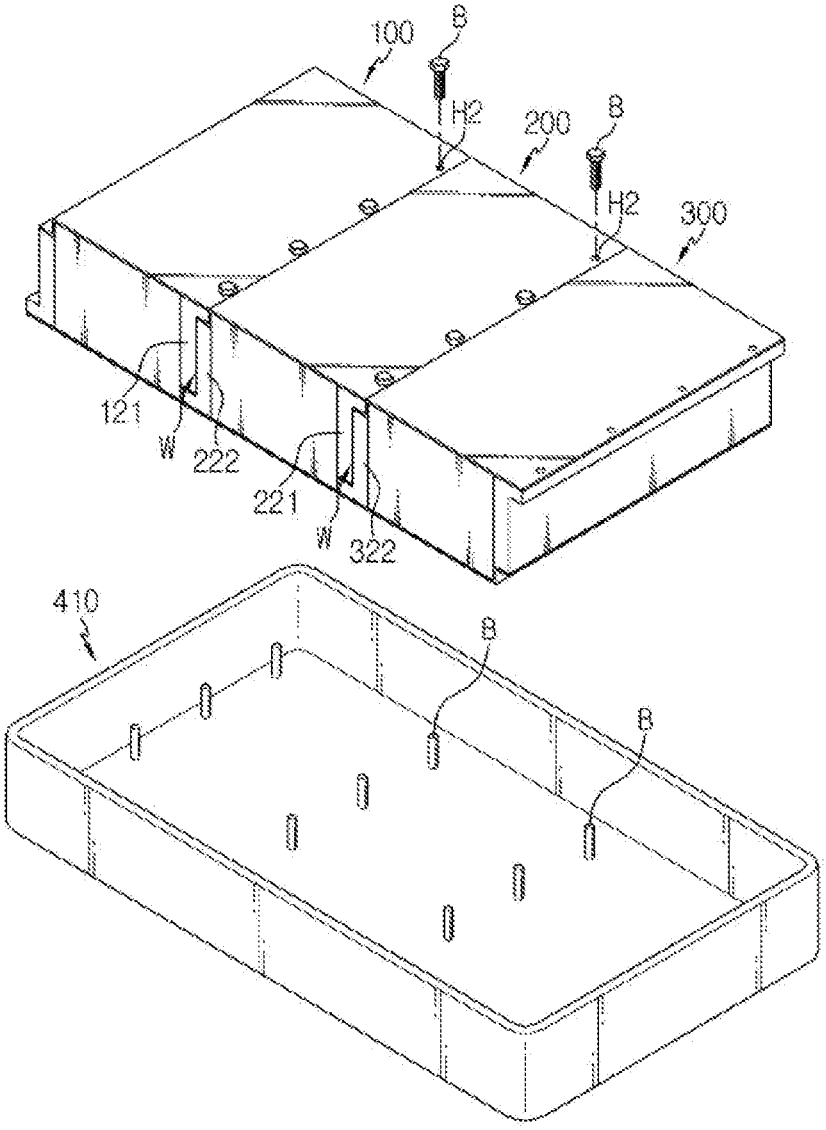
FIG. 5 is a schematic perspective view showing main components of a battery pack according to an embodiment of the present disclosure.
Figure 6:
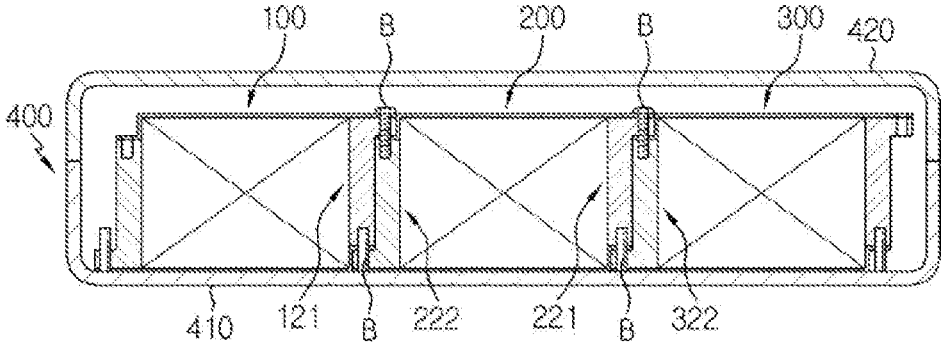
FIG. 6 is a schematic cross-sectioned view showing the battery pack according to an embodiment of the present disclosure.

FIG. 5 is a schematic perspective view showing main components of a battery pack according to an embodiment of the present disclosure, and FIG. 6 is a schematic cross-sectioned view showing the battery pack according to an embodiment of the present disclosure.

Referring to FIGS. 5 and 6, a battery pack according to an embodiment of the present disclosure includes three unit battery modules 100, 200, 300 and a pack case 400 covering the unit battery modules.

Three unit battery modules 100, 200, 300 are all of the same structure and may be structurally connected successively in a lateral direction. The battery pack of this embodiment includes the first unit battery module 100, the second unit battery module 200 and the third unit battery module 300, but the battery pack may be easily extended by increasing the number of unit battery modules according to a demanded size of the battery pack.

The connection structure among the unit battery modules 100, 200, 300 will be described in more detail. Here, the first unit battery module 100 and the second unit battery module 200 are connected to each other, and the second unit battery module 200 is also connected to the third unit battery module 300. At this time, a right side plate 121 of the first unit battery module 100 and a left side plate 222 of the second unit battery module 200 are engaged to form a single common wall W, and a right side plate 221 of the second unit battery module 200 and a left side plate 322 of the third unit battery module 300 are engaged to form another single common wall W.

Referring to FIGS. 3 to 6 together, the first engagement portion 121a of the right side plate 121 of the first unit battery module 100 may be placed on the second engagement portion 222b of the left side plate 222 of the second unit battery module 200, and the first engagement portion 222a of the left side plate 222 of the second unit battery module 200 may be placed below the second engagement portion 121b of the right side plate 121 of the first unit battery module 100 on the contrary. If the right side plate 121 of the first unit battery module 100 and the left side plate 222 of the second unit battery module 200 are connected to each other, the first coupling holes H1 and the second coupling holes H2 of the respective side plates are matched with each other in an upper and lower direction.

In this state, the coupling member B may be inserted into the first coupling holes H1 and the second coupling holes H2 to assemble the first unit battery module 100 and the second unit battery module 200 into a single body. In the same way, the third unit battery module 300 may be successively assembled to the first unit battery module 100 and the second unit battery module 200.

At this time, holes through which the coupling member B may pass may also be provided at the upper plate 130 and the lower plate 140 so that the upper plate 130 and the lower plate 140 are integrally assembled with the side plates. According to this configuration, since one coupling member B is connected to two unit battery modules 100, 200, the number of coupling units required to mount the unit battery modules 100 may be reduced, compared to the conventional battery pack assembling work.

Meanwhile, the pack case 400 may include a tray 410 giving a space where the plurality of unit battery modules 100 are placed and a pack cover 420 for packaging the plurality of unit battery modules 100 in combination with the tray 410. The tray 410 and the pack cover 420 may be fabricated so that circumferences of the tray 410 and the pack cover 420 are in contact with each other, and be coupled in an upper and lower direction.

In particular, the tray 410 may further include a long bolt B that is provided to protrude from a surface thereof. The long bolt B is used as a coupling member B that mounts the first to third unit battery modules 100, 200, 300 onto the tray 410.

A plurality of long bolts B may be provided on the basis of mounting positions of the first to third unit battery modules 100, 200, 300, and preferably be provided at positions where the common walls W of the first to third unit battery modules 100, 200, 300 are placed. For example, on the tray 410 of this embodiment, the long bolts may be provided in a one-to-one relationship with the coupling holes H1, H2 located below two common walls W of three unit battery modules 100.

According to this configuration, three unit battery modules 100, 200, 300 may be fixed on the tray 410 in a state where the long bolt B is inserted therein. However, the scope of the present disclosure is not limited thereto, and three unit battery modules 100, 200, 300 may be placed on the top of the tray 410 and then three unit battery modules 100, 200, 300 and the tray 410 may be integrally coupled using bolts.

As described above, in the battery pack according to the present disclosure, three unit battery modules 100, 200, 300 are connected to each other to form a single body and share two common walls W. Here, the common wall W may function as a crash beam of a conventional battery pack. In other words, the common wall W may give both a module housing function of the battery module 100 and a crash beam function of the conventional battery pack. In this sense, the common wall W may be regarded as a structure that integrates a part of a module housing and a crash beam.

Thus, the battery pack of the present disclosure may secure sufficient mechanical stiffness by means of the common wall W without installing a crash beam separately. Also, since the plurality of unit battery modules 100, 200, 300 are structurally connected successively, more battery modules may be loaded in the pack case 400, compared to a conventional battery pack. Thus, the battery pack of the present disclosure may satisfy both mechanical stiffness and high energy density.

Next, referring to FIGS. 7 to 9, modified examples of the side plate of this embodiment will be described. The modified examples of the present disclosure described below may be regarded as corresponding to FIG. 4, when being compared to the above embodiments. The same reference numerals denote the same components, and the same components will not be described in detail, but different features from the side plate described above will be described in detail.

Figure 7:
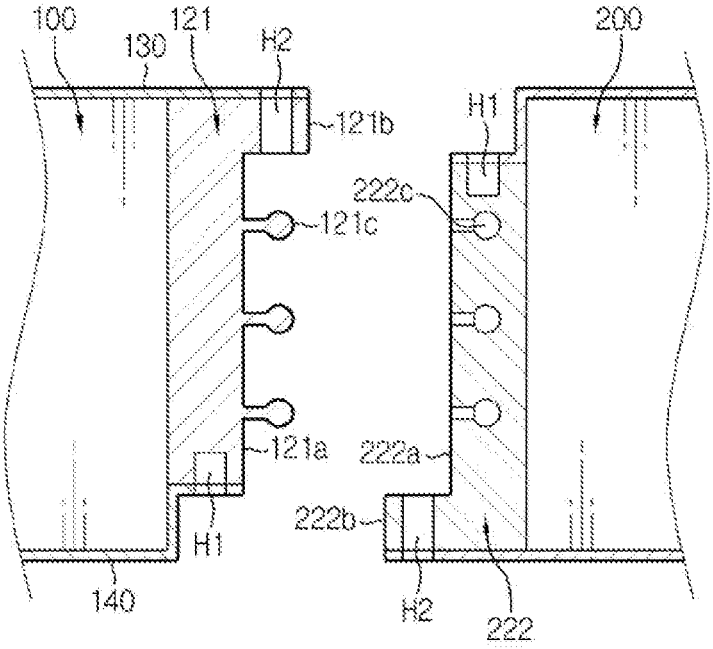
FIGS. 7 to 9 are diagrams showing modified examples of the side plate of FIG. 4, respectively.

First, referring to FIG. 7, a fitting protrusion 121c may be provided to any one of the right side plate 121 and the left side plate 122 according to this modified example, and a fitting groove 222c may be provided to the other side thereof so that the fitting protrusion 121c may be fitted thereto.

The coupling between the side plates of the former embodiment is just by engagement, but the coupling between the side plates 121, 222 of this modified example is by fitting, and thus the coupling force of the side surfaces may be further reinforced in this modified example. Here, the shapes of the fitting protrusion 121c and the fitting groove 222c are not limited to those of FIG. 7, and any shape may be used as long as they are able to be fitted. In addition, in this modified example, the fitting protrusions 121c are formed at the right side plate 121 and the fitting grooves 222c are formed at the left side plate 122. However, they may be formed contrarily, and also the fitting protrusions 121c and the fitting grooves 222c may also be mixed at the right side plate 121 and the left side plate 122.

Figure 8:
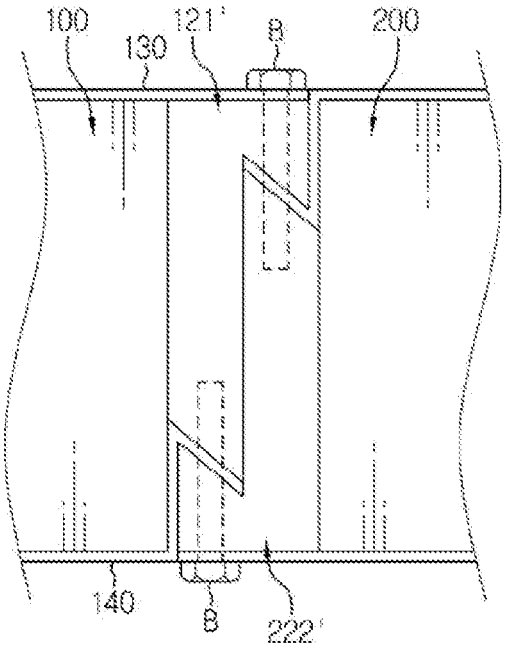
Figure 9:
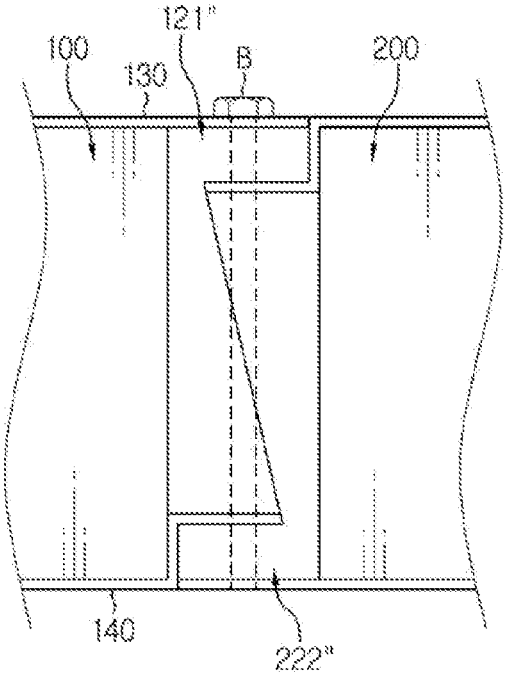

Next, referring to FIGS. 8 and 9, the engagement surface of the side plate according to other modified examples of the present disclosure may be provided in a zigzag form, different from the former embodiment.

First, in the modified example of FIG. 8, the right side plate 121' is mounted in an oblique direction or in an upper and lower direction with respect to the left side plate 222', and the right side plate 121' is engaged with the left side plate 222' so as to be put thereon. In this case, the coupling force between the unit battery modules 100, 200 in the lateral direction may be more stable than the former embodiment.

Next, the engagement surface of the side plate according to the modified example of FIG. 9 has a substantially "Z" shape, and the first coupling hole H1 and the second coupling hole H2 may be matched with each other in an upper and lower direction at the center of the common wall W. Thus, in this modified example, the side plates 121", 222" may be firmly fixed using a single coupling member B.

Subsequently, a unit battery module according to the present disclosure and a battery pack including the unit battery module will be described with reference to FIGS. 10 to 12. The features identical to that of the embodiment will not be explained in detail, and different features will be mainly described.

Figure 10:
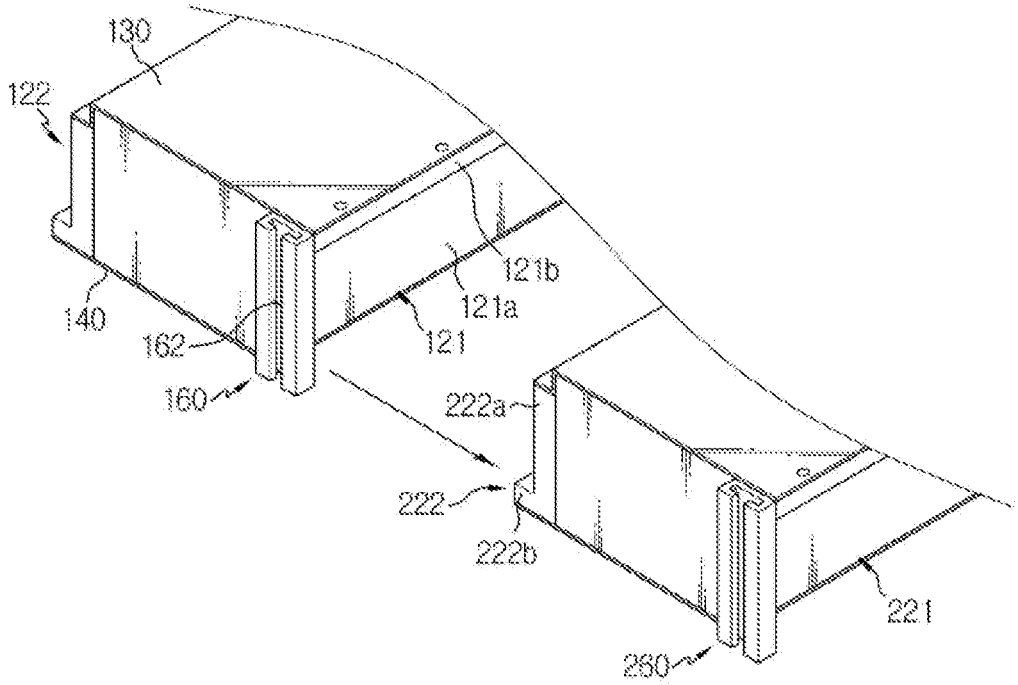
FIG. 10 is a partial perspective view showing a unit battery module having a tray connection unit according to another embodiment of the present disclosure.
Figure 11:
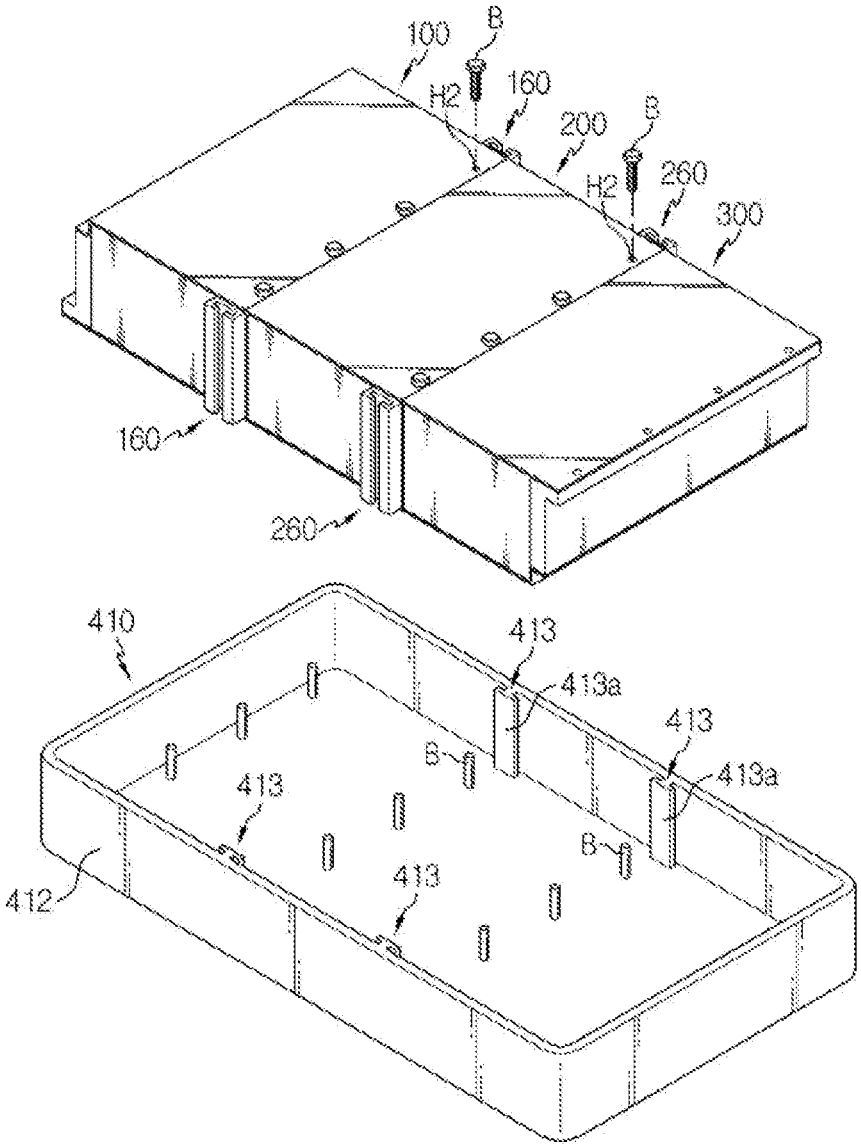
FIG. 11 is a schematic perspective view showing main components of a battery pack according to another embodiment of the present disclosure.
Figure 12:
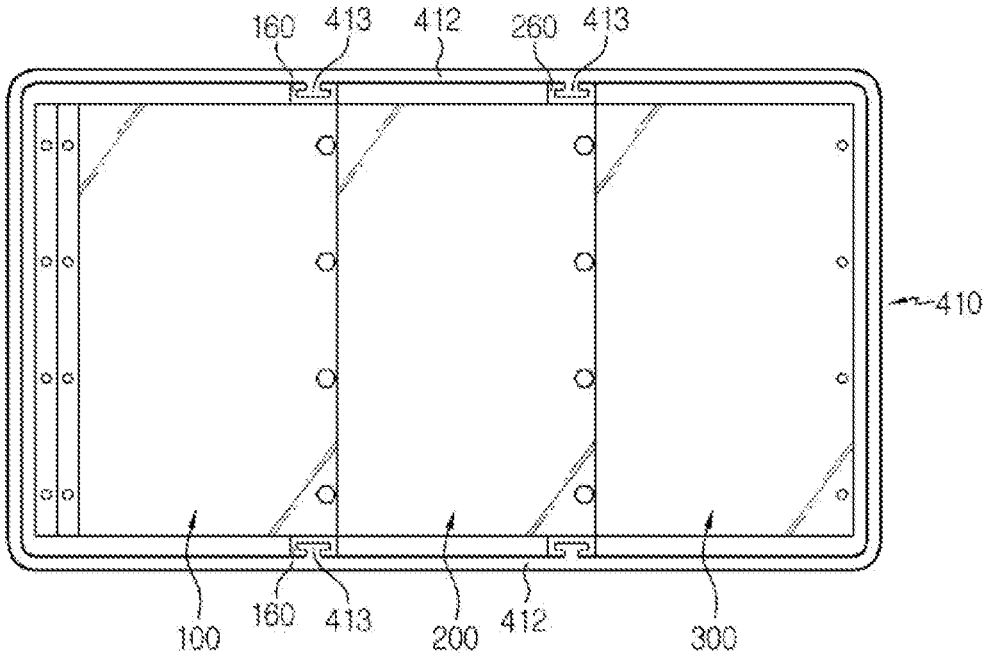
FIG. 12 is a plane view showing that the unit battery modules of FIG. 11 are loaded on a tray.

FIG. 10 is a partial perspective view showing a unit battery module having a tray connection unit according to another embodiment of the present disclosure, FIG. 11 is a schematic perspective view showing main components of a battery pack according to another embodiment of the present disclosure, and FIG. 12 is a plane view showing that the unit battery modules of FIG. 11 are loaded on a tray.

Referring to FIGS. 10 to 12, a battery pack according to another embodiment of the present disclosure may further include a tray connection unit 160 provided at the unit battery modules and a module connection unit 413 provided at the wall of the tray in order to connect the unit battery module to the tray 410 of the pack case.

The tray connection unit 160 may be integrally formed with the side plate to further protrude in the front and rear directions of the unit battery module in comparison to other portions. For example, as shown in FIGS. 10 and 11, one the tray connection unit 160, 260 may be provided to each of both ends of the right side plates 121, 221. As an alternative of this embodiment, the tray connection units 160, 260 may be provided to both ends of the left side plates 222, 322, or provided to both ends of the right side plates 121 and the left side plate 222 so that one portion and the other portion of the tray connection units 160, 260 are shared.

The tray connection units 160, 260 according to this embodiment have a rectangular pillar shape in which a groove 162 is provided to form an empty space in an upper and lower direction. The shape of the groove 162 is provided so as to be engaged with a module connection unit 413 of a tray, explained later.

The module connection unit 413 may be formed to protrude from an inner surface of the wall 412 of the tray at a predetermined position along the periphery of the wall 412. Here, the predetermined positions correspond to positions intersecting the common walls W of the unit battery modules 100, 200, 300 when the unit battery modules 100, 200, 300 connected to each other are loaded to the tray 410. For example, as shown in FIG. 11, two tray connection units 160, 260 may be provided at both facing walls 412 with a predetermined gap therebetween.

In addition, the module connection unit 413 according to this embodiment may include a head portion 413a of which at least a portion extending in a protruding direction has a width in the right and left direction, which is greatly enlarged than other portions, and the module connection unit 413 may have the same cross section along the height direction of the wall 412. In this embodiment, the module connection unit 413 has a cross section close to the "T" shape and extended as much as the height of the tray wall 412.

In the module connection unit 413, the head portion 413a slides in the groove 162 of the tray connection units 160, 260 in an upper and lower direction and is engaged with the tray connection units 160, 260. That is, in this embodiment, the module connection unit 413 slides in the upper and lower direction and is coupled to the tray connection units 160, 260 having a rectangular pillar shape with an empty inner space, and thus the module connection unit 413 may be disposed in the empty space. Thus, when the unit battery modules 100, 200, 300 are loaded to the tray 410, the tray connection units 160, 260 of the unit battery modules 100, 200, 300 and the module connection units 413 of the tray 410 are located at corresponding positions, respectively.

If the unit battery modules 100, 200, 300 are loaded to the tray 410 as in FIG. 12, the head portion of the module connection unit 413 may be restricted not to move in a horizontal direction since the head portion is engaged with the groove 162 of the tray connection units 160, 260. In addition, the unit battery modules 100, 200, 300 may be vertically coupled to the tray 410 using bolts so as to restrict vertical movement thereof.

In particular, according to this embodiment, both side walls 412 of the tray 410 are connected to the tray connection units 160, 260, and the tray connection units 160, 260 are integrally connected to the side plates that form the common wall W. Thus, both side walls 412 of the tray 410 are supported by the common walls W of the unit battery modules 100, 200, 300. That is, according to this configuration, the common wall W shared by the unit battery modules 100, 200, 300 supports both side walls 412 of the tray 410, and thus it is possible to prevent distortion or deformation of the side walls of the tray 410 even though vibrations or impacts are generated while a vehicle is running.

Meanwhile, the battery pack according to the present disclosure may further include various devices for controlling charge and discharge of the battery modules, such as a battery management system (BMS), a current sensor, a fuse and the like. The battery pack may be applied not only to vehicles such as electric vehicles and hybrid electric vehicles but also to other information technology (IT) products.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or a shape in which an object is placed.

What is claimed is:

1. A battery pack, comprising:

a plurality of unit battery modules, each unit battery module having a plurality of battery cells accommodated in an inner space thereof, the plurality of unit battery modules being structurally connected successively in [one] *a horizontal* direction; and a pack case configured to cover the plurality of unit battery modules, wherein each unit battery module has two side plates forming opposite side surfaces thereof, and wherein one of the side plates of any one of the unit battery modules and one of the side plates of another one of the unit battery modules adjacent thereto are engaged with each other to form a single common wall, the two side plates of each unit battery module include a right side plate forming a right surface of the respective unit battery module and a left side plate forming a left surface of the respective unit battery module, the right side plate and the left side plate of each unit battery module being symmetrical with one another, wherein the right side plate and the left side plate of each unit battery module each have longitudinal sections, the right side plate being inverted relative to the left side plate, and *wherein a plurality of* the right and left side plates [are] *each have at least a respective shorter region which is* shorter than a height of the respective unit battery module so that a [right] side step is [formed] *defined* between [a] *an upper or* lower end surface of the unit battery module and a [lower end] *horizontal* surface of the [right side plate, and a left side step is formed between an upper end surface of the unit battery module and an upper end surface of the left side plate] *shorter region*, and wherein [each] *the* unit battery [module includes an upper plate and a lower plate] *modules include a plurality of horizontal plates*, which *extend to abut and* cover [upper and lower portions of the inner space, respectively] *at least portions of the horizontal surfaces of the shorter regions defining the side steps*, and the [upper and lower] *horizontal* plates [of each unit battery module] *each* have a step portion formed therein, the step [portion of the upper and lower plates] *portions* configured to [mate with the left side step and the right side step of adjacent ones of the unit battery modules] *align with an extend over the respective horizontal surfaces of the shorter regions defining the side steps*.

2. The battery pack according to claim 1, wherein the right side plate of the any one of the unit battery modules is engaged with the left side plate of the another one of the unit battery modules adjacent thereto.

3. The battery pack according to claim 2, wherein the one of the side plates of the any one of the unit battery modules has a fitting protrusion extending therefrom, and the one of the side plates of the another one of the unit battery modules has a fitting groove extending therein, so that the fitting protrusion fits into the fitting groove.

4. The battery pack according to claim 1, wherein the side plates of each unit battery module each have engagement surfaces having zigzag shape.

5. The battery pack according to claim 1, wherein the pack case includes a tray having an internal space in which the plurality of unit battery modules are placed, and wherein the plurality of unit battery modules are mounted onto the tray by a coupling member that couples the single common wall to the tray.

6. The battery pack according to claim 1, wherein the pack case includes a tray having an internal space in which the plurality of unit battery modules are placed and has a plurality of module connection units protruding from an inner surface of a wall surrounding the internal space, and wherein each of the side plates of each unit battery module includes a tray connection unit that protrudes from the side plate in respective front and rear directions of the unit battery module, and each tray connection unit has a groove formed therein that is configured to be engaged with a corresponding one of the module connection units so as to be inserted into and coupled to the corresponding one of the module connection units.

7. The battery pack according to claim 6, wherein each module connection unit includes a head portion configured to be placed in sliding engagement with the groove of a corresponding one of the tray connection units.

8. A vehicle, comprising the battery pack defined in claim 1.

* * * * *